(12) United States Patent
Hosokawa

(10) Patent No.: US 6,865,147 B2
(45) Date of Patent: Mar. 8, 2005

(54) OPTICAL MAGNETIC RECORDING MEDIUM AND STORAGE DEVICE

(75) Inventor: Tetsuo Hosokawa, Higashine (JP)

(73) Assignee: Fujitsu Limited, Kawasaki (JP)

(*) Notice: Subject to any disclaimer, the term of this patent is extended or adjusted under 35 U.S.C. 154(b) by 235 days.

(21) Appl. No.: 10/107,590

(22) Filed: Mar. 27, 2002

(65) Prior Publication Data

US 2003/0099187 A1 May 29, 2003

(30) Foreign Application Priority Data

Nov. 26, 2001 (JP) ........................................ 2001-359310

(51) Int. Cl.⁷ .............................................. G11B 11/00
(52) U.S. Cl. ...................................................... 369/288
(58) Field of Search ............................ 369/13.4, 13.41, 369/13.5, 288, 13.28, 282

(56) References Cited

U.S. PATENT DOCUMENTS 5,935,701 A    8/1999   Nishimura ................. 428/332
6,633,514 B1 * 10/2003  Awano et al. ............ 369/13.28

FOREIGN PATENT DOCUMENTS

| JP | 8-106660 | 4/1996 |
| JP | 2000-163817 | 6/2000 |
| JP | 2000-268426 | 9/2000 |

OTHER PUBLICATIONS

U.S. Appl. No. 09/880,347, filed Jun. 13, 2001, Hosokawa et al.

* cited by examiner

*Primary Examiner*—William Klimowicz
(74) *Attorney, Agent, or Firm*—Greer, Burns & Crain, Ltd.

(57) ABSTRACT

An optical magnetic recording medium in which reproduction is implemented by transcribing a mark to a reproducing layer based on a magnetic field from a recording layer, includes a reproducing layer, a non-magnetic layer, and a recording layer including a first recording layer and a second recording layer, wherein the reproducing layer, the non-magnetic layer, and the recording layer including the first recording layer and the a second recording layer are stacked in this sequence; the regenerating layer has a property of an easy magnetization in an in-plane direction at room temperature; the first recording layer and the second recording layer each has a property of easy magnetization in a vertical direction to the in-plane direction at room temperature in a single layer; and there is a relation of M2<M1 wherein a composition of a rare-earth metal comprising the first recording layer is defined as M1 (at %) and a composition of a rare-earth metal comprising the second recording layer is defined as M2 (at %).

10 Claims, 8 Drawing Sheets

OPTICAL MAGNETIC RECORDING MEDIUM AND STORAGE DEVICE

BACKGROUND OF THE INVENTION

1. Field of the Invention

The present invention generally relates to optical magnetic recording media and storage devices and more particularly, to an optical magnetic recording medium suitable for high density recording and a storage device using the optical magnetic recording medium.

2. Description of the Related Art

An optical magnetic disk employing the magnetically induced super resolution (MSR) method has been suggested as an optical magnetic recording medium by which recording density can be improved. In the MSR method, a multi-layer film of a rare-earth transition metal alloy is used.

FIG. 1 is a cross sectional view of a part of an example of an MSR recording medium of a center aperture detection (CAD) method in a related art. The MSR recording medium shown in FIG. 1 includes a reproducing layer 1, a non-magnetic layer 2, and a recording layer 3. The reproducing layer 1 is made of GdFeCo. The non-magnetic layer 2 is made of SiN. The recording layer 3 is made of TbFeCo. In an MSR reproducing method, a recording bit having a smaller measurement than a spot diameter of a laser beam can be read out by applying a temperature distribution caused by an irradiation of the laser beam to the MSR recording medium. In the CAD method, the reproduction is implemented by using a magnetic field generated from a mark of the recording layer 3. That is, the magnetic field is generated from the mark recorded in the recording layer 3 and the generation is implemented by completing the magnetization of the reproducing layer 1 in a direction of the magnetic field. Namely, the reproduction is implemented by transcribing a magnetic mark of the recording layer 3 to the reproducing layer 1 based on a magneto-static combination. An in-plane layer is used at a room temperature as the reproducing layer 1. The mark of the recording layer 3 with regard to a part having a high temperature based on the irradiation of the laser beam is transcribed so that a part other than the reproduced part is masked. As a result, it is possible to implement the super resolving reproduction.

In addition, the magnetic amplifying magneto-optical system (MAMMOS) in which a medium structure similar to the structure shown in FIG. 1 is used is known. In the MAMMOS, a mark of a recording layer is transcribed to a reproducing layer and the mark transcribed to the reproducing layer transcribed is expanded so that a reproducing signal can be amplified.

In either of the above mentioned methods, a transcription based on the magneto-static combination by the magnetic field from the recording layer is used as a reproduction principle.

In the MSR recording medium of the CAD method as described above, a magnetization of the reproducing layer 1 other than an aperture part is not detected since the magnification is implemented in-plane. Accordingly, there is no signal leaked out from a neighboring track. The MSR recording medium having the CAD method is strong against cross talk and it is possible to make the track pitch narrow. The magnetization of the MSR recording medium of the CAD method is implemented by reversing a direction of the magnetization of the reproducing layer 1 in the magnetic field of the recording layer 3 shown in FIG. 1. In order to obtain a good reproducing property, it is necessary to use a material having a large Ms (magnetizations) as the recording layer 3. Ms of the recording layer 3 can be made large by reducing a rare-earth metal composition such as Tb used for the recording layer 3. Thus, a transcription of the mark recorded in the recording layer 3 to the reproducing layer 1 improves by reducing Tb in the recording layer 3 and thereby increasing Ms. As a result, the MSR recording medium is proof against a neighboring track's influence on the magnetic field from the mark of the reproducing magnetic field.

However, if Tb in the recording layer becomes little, a magnetic field necessary for recording becomes large. Hence, a problem may occur in terms of the magnetic field modulation recording. Accordingly, it is necessary to be capable of recording to the optical magnetic recording medium even if the magnetic field is small enough. In addition, a small recording magnetic field and a small erase magnetic field are preferable in a case of an optical modulation recording. Furthermore, when Tb of the recording layer is little, the reproducing property becomes worse. Particularly, the reproducing property becomes much worse at a short mark. If a property of the short mark is not sufficient, it is not possible to record with a high density. Accordingly, the property at the short mark is very important in order to make the recording capacity of the optical magnetic recording medium large.

SUMMARY OF THE INVENTION

Accordingly, it is a general object of the present invention to provide a novel and useful optical magnetic recording medium and storage device in which one or more of the problems described above are eliminated.

Another and more specific object of the present invention is to provide an optical magnetic recording medium in which reproduction is implemented by transcribing a mark to a reproducing layer based on a magnetic field from a recording layer, comprising a reproducing layer, a nonmagnetic layer, and a recording layer including a first recording layer and a second recording layer, wherein the reproducing layer, the non-magnetic layer, and the recording layer including the first recording layer and the a second recording layer are stacked in this sequence, the regenerating layer has a property of an easy magnetization in an in-plane direction at room temperature, the first recording layer and the second recording layer each has a property of easy magnetization in a vertical direction to the in-plane direction at room temperature in a single layer, and there is a relation of M2<M1 wherein a composition of a rare-earth metal comprising the first recording layer is defined as M1 (at %) and a composition of a rare-earth metal comprising the second recording layer is defined as M2 (at %).

The above objects of the present invention are achieved by an optical magnetic recording medium in which reproduction is implemented by transcribing a mark to a reproducing layer based on a magnetic field from a recording layer, comprising a reproducing layer, a non-magnetic layer, and a recording layer including a first recording layer through an Nth recording layer, wherein the reproducing layer, the non-magnetic layer, and the recording layer including the first recording layer through the Nth recording layer are stacked in this sequence, the regenerating layer has a property of an easy magnetization in an in-plane direction at room temperature, the first recording layer through the Nth recording layer each has a property of an easy magnetization in a vertical direction to the in-plane direction at room temperature in a single layer, and there is a relation of MN<M(N-1)< . . . <M1 wherein a composition of a rare-earth metal consisting of the first recording layer is defined as M1 (at %), . . . , and a composition of a rare-earth metal consisting of the Nth recording layer is defined as MN (at %).

The above objects of the present invention are also achieved by a storage device, comprising a head for applying a magnetic field to an optical magnetic recording medium and an optical head irradiating an optical beam to the optical magnetic recoding medium, wherein the optical magnetic recording medium in which reproduction is implemented by transcribing a mark to a reproducing layer based on a magnetic field from a recording layer, comprises a reproducing layer, a non-magnetic layer, and a recording layer including a first recording layer and a second recording layer, wherein the reproducing layer, the non-magnetic layer, and the recording layer including the first recording layer and the second recording layer are stacked in this sequence, the regenerating layer has a property of an easy magnetization in an in-plane direction at room temperature, the first recording layer and the second recording layer each has a property of easy magnetization in a vertical direction to the in-plane direction at room temperature in a single layer, and there is a relation of M2<M1 wherein a composition of a rare-earth metal comprising the first recording layer is defined as M1 (at %) and a composition of a rare-earth metal comprising the second recording layer is defined as M2 (at %).

According to the present invention as described above, it is possible to obtain the optical magnetic medium and the storage device using the optical magnetic medium, wherein a necessary recording magnetic field is small, a ratio of a carrier to a noise (C/N ratio) in a short mark is suitable, and the optical magnetic medium has a wide reproducing magnetic field margin.

Other objects, features, and advantages of the present invention will become more apparent from the following detailed description when read in conjunction with the accompanying drawings.

DETAILED DESCRIPTION OF THE PREFERED EMBODIMENTS

A description will now be given, with reference to the FIGS. 2 through 14, of embodiments of the present invention.

Figure 1:
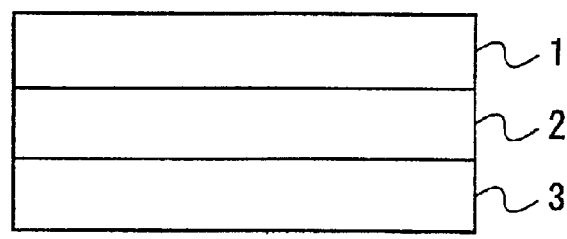
FIG. 1 is an cross sectional view of a part of an example of a MSR recording medium of the center aperture detection (CAD) method in a related art.
Figure 2:
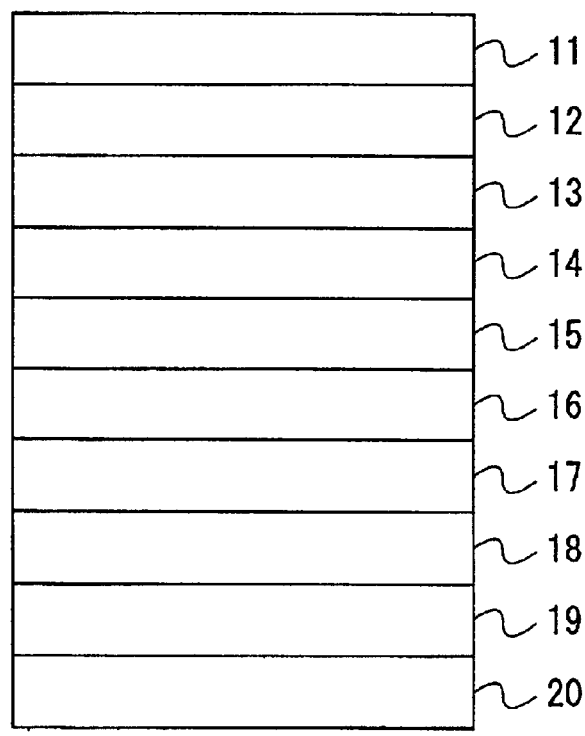
FIG. 2 is a cross sectional view of a part of an optical magnetic recording medium of a first embodiment according to the present invention.

FIG. 2 is a cross sectional view of a part of an optical magnetic recording medium of a first embodiment according to the present invention. The optical magnetic recording medium shown in FIG. 2 includes a substrate 11, a first dielectric layer 12, a reproducing layer 13, a reproducing support layer 14, a non-magnetic layer 15, a first recording layer 16, a second recording layer 17, a recording support layer 18, a second dielectric layer 19 and a sensitivity adjustment layer 20.

In this embodiment, since a land-groove recording method is applied, a land groove substrate whose surface has a land and a groove is used as the substrate 11. In the land-groove recording method, the information is recorded to the land and the groove existing on the optical magnetic recording medium reciprocally. It is preferable that a difference in level of the land and the groove of the substrate 11 be of 30 through 200 nm. The first dielectric layer 12, the reproducing layer 13, the reproducing support layer 14, the non-magnetic layer 15, the first recording layer 16, the second recording layer 17, the recording support layer 18, the second dielectric layer 19 and the sensitivity adjustment layer 20 are stacked on the substrate 11 in sequence. The first dielectric layer 12 is made of SiN, for example. The reproducing layer 13 is made of GdFeCo, for example. The reproducing support layer 14 is made of GdFe, for example. The non-magnetic layer 15 is made of SiN, for example. The first recording layer 16 is made of TbFeCo, for example. The second recording layer 17 is made of TbFeCo, for example. The recording support layer 18 is made of GdFeCo, for example. The second dielectric layer 19 is made of SiN, for example. The sensitivity adjustment layer 20 is made of Al, for example. Generally, the sensitivity adjustment layer 20 is coated with a protection coat made of an ultraviolet rays curing resin, for example.

Magnetic layers, namely the reproducing layer 13, the first recording layer 16, the second recording layer 17, and the recording support layer 18, consist of a rare-earth transition metal material (RE-TM). The reproducing layer 13 has a property of easy magnetization in an in-plane direction at a room temperature. The first layer 16 and the second recording layer 17 respectively, in a single layer, has a property of easy magnetization in a vertical direction to the in-plane direction at a room temperature. It is possible to add an element such as Cr, Ti, and Ta to these magnetic layers in order to improve an ability of a resistance or to arrange the sensitivity. However, a material for these magnetic layers is not limited to the above-mentioned materials. A material for the non-magnetic layer 15 is not limited as long as an exchange combination force between the reproducing layer 13 and the recording layers 16 and 17 can be made small. The exchange combination force between the reproducing layer 13 and the recording layers 16 and 17 cancels the magneto-static combination force between the reproducing layer 13 and the recording layers 16 and 17. Accordingly, the exchange combination force may be made small as long as a quality of the reproducing signal is not reduced. SiN, Si, Al, Gd, Th, Dy or others can be used as a material for the non-magnetic layer 15. It is possible to control the exchange combination force by selecting the material for the non-magnetic layer 15 and a film thickness properly.

Next, a manufacturing method of the optical magnetic recording medium of this embodiment will be described. A plastic substrate having a gap between neighboring land and groove of 0.65 µm and a difference in level of the land and the groove of 40 nm is prepared as the substrate 11. This substrate 11 is inserted into a spatter apparatus including plural deposition chambers having an accessible vacuum degree of $5 \times 10^{-5}$ (Pa) or less. The substrate 11 is carried to a first chamber in which a Si target is installed. Ar gas and $N_2$ gas are introduced into the chamber so that electricity for DC spattering is discharged. The SiN first dielectric layer 12 is deposited by reactive spattering. The film of the SiN first dielectric layer 12 is controlled to have a thickness of 80 nm. Next, the substrate 11 is carried to another chamber. The reproducing layer 13 made of $Gd_{30}Fe_{51}CO_{14}$ of an RE composition rich at a room temperature, namely having a room temperature or more as a compensation temperature, is deposited so that the reproducing layer 13 has a thickness of 30 nm. Next, the reproducing support layer 14 made of $Gd_{13}Fe_{87}$ is deposited to have a thickness of 7 nm. The reproducing support layer 14 is provided to improve a quality of the reproducing signal. Next, the substrate 11 is returned to the first chamber and the SiN non-magnetic layer 15 having a thickness of 2 nm is deposited.

After the substrate 11 is moved to another chamber and the first recording layer 16 and the second recording layer 17 are deposited. The first recording layer 16 and the second recording layer 17 are deposited by two kinds and simultaneous spattering of a Tb target and a $Fe_{86}Fe_{14}$ target. The compositions of the recording layers 16 and 17 are controlled by adjusting electric power applied to the both targets, so that the recording layers 16 and 17 are deposited. Next, the substrate 11 is moved to a chamber including a Gd target and a $Fe_{80}CO_{20}$ target and the recording support layer 18 is deposited. The composition of the recording support layer 18 is changed by adjusting electric power applied to both targets. Film thickness of the recording layers 16 and 17 and the recording support layer 18 are changed based on sputtering time. As described above, a plurality of samples having different compositions and film thickness are made by controlling the electric power and deposition time. Next, the respective sample substrates 11 are moved to the first chamber one by one. The SiN second dielectric layer 19 having a thickness of 20 nm and the Al sensitivity adjustment layer 20 having a thickness of 30 nm are deposited. The sensitivity adjustment layer 20 is coated with a protective coating made of an ultraviolet ray curing resin so that an optical magnetic recording medium using the respective samples is made.

Inventors of the present invention measured the C/N ratio of the optical magnetic recording medium of the respective samples made by the above mentioned method by using a spectrum analyzer. The measurement was implemented by an optical modulation recording with a laser beam having a linear velocity of 7.5 m/s and a wave length of 650 nm, in a state where the recording mark has a length of 0.34 µm and an object lens has a numerical aperture of 0.55.

Figure 3:
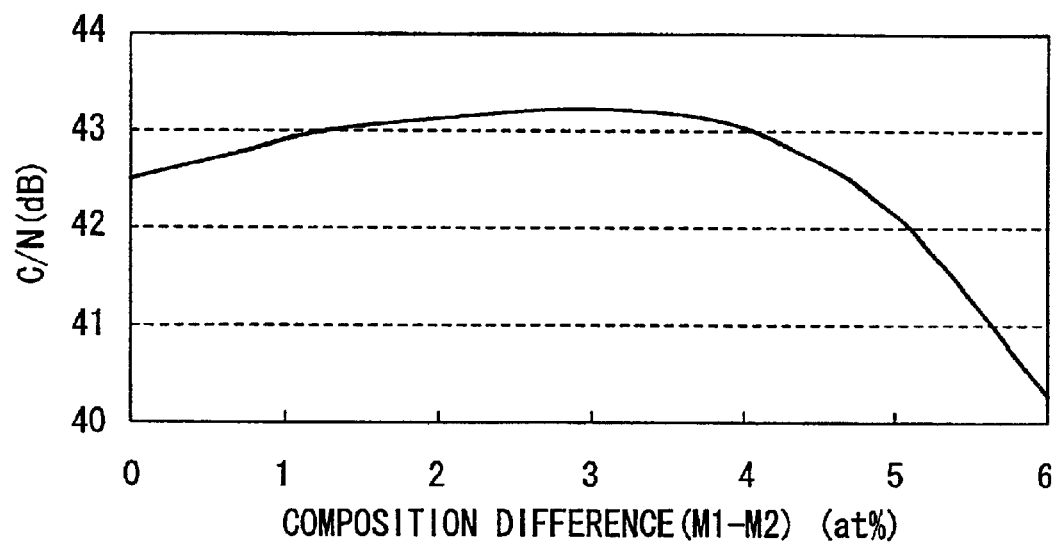
FIG. 3 is a graph indicating a C/N ratio to a composition difference of first and second recording layers.

FIG. 3 is a graph indicating the C/N ratio to a composition difference of the recording layers 16 and 17, namely a graph showing a dependence of the C/N ratio to the composition difference of the recording layers 16 and 17. A result of the measurement is obtained in the following conditions. An average composition of the first recording layer 16 and the second recording layer 17, namely (M1+M2)/2, is 19.0 (at %); the first recording layer 16 has a film thickness t1 of 25 nm; the second recording layer 17 has a film thickness t2 of 25 nm; the recording support film 18 has a film thickness t3 of 5 nm; and Gd composition Ass, namely Ass-Gd, of the recording support layer 19 is 23.0 (at %). Here, an M1 (at %) indicates a composition of a rare-earth metal of the first recording layer 16 and an M2 (at %) indicates a composition of a rare-earth metal of the second recording layer 17.

A part where the composition difference of the recording layers 16 and 17 equals 0 in FIG. 3 shows a property of an optical magnetic recording medium consisting of a conventional single recording layer. The inventors recognized that the recording layer made becomes multi-layer and the composition difference was set as 1% or more so that the C/N ratio was improved as showed in FIG. 3. The inventors also realized that as the composition difference becomes 4% or more, the C/N ratio was reduced immediately.

Figure 4:
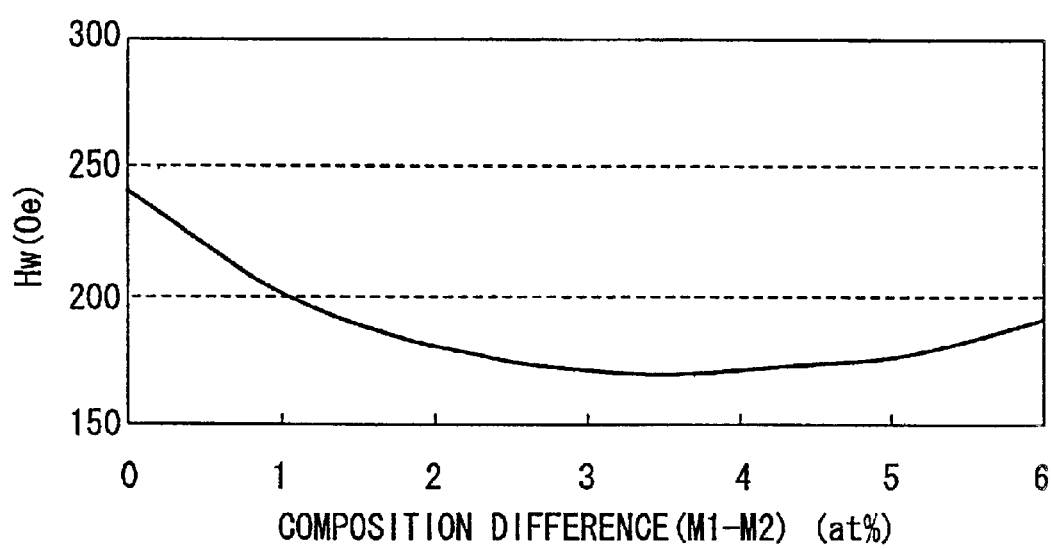
FIG. 4 is a graph indicating a recording magnetic field to a composition difference of first and second recording layers.

FIG. 4 is a graph indicating a recording magnetic field Hw to a composition difference of first recording layer 16 and second recording layer 17, namely a graph showing a dependence of the magnetic field on the composition difference of the recording layers 16 and 17. A result of the measurement showed in FIG. 4 is obtained in the following conditions. That is, after the recording magnetic field was initialized in a minus direction, recording was implemented by changing the recording magnetic field in a plus direction so that the C/N ratio was measured. A magnetic field in which the C/N ratio is saturated is defined as Hw1. Similarly, after the recording magnetic field was initialized in a minus direction, recording was implemented by changing the recording magnetic field of a minus direction, so that the C/N ratio was measured. A magnetic field in which the C/N ratio becomes zero completely, namely, a magnetic field in which recording cannot be implemented at all, is defined as Hw2. A magnetic field having a bigger absolute value between Hw1 and Hw2 is defined as a recording magnetic field Hw. The magnetic field Hw has an object in that both a plus side C/N ratio saturation value and a minus side C/N ratio saturation value be zero.

As showed in FIG. 4, it was realized that the recording magnetic field Hw could be reduced to 200 (Oe) or less if a composition difference of first recording layer 16 and second recording layer 17 was 1% or more. Hence, it was realized that a difference of the composition between the first recording layer 16 and the second recording layer 17 may be set in a range of 1% to 4% in order to satisfy both the C/N ratio and the recording magnetic field Hw, as showed in FIGS. 3 and 4.

Figure 5:
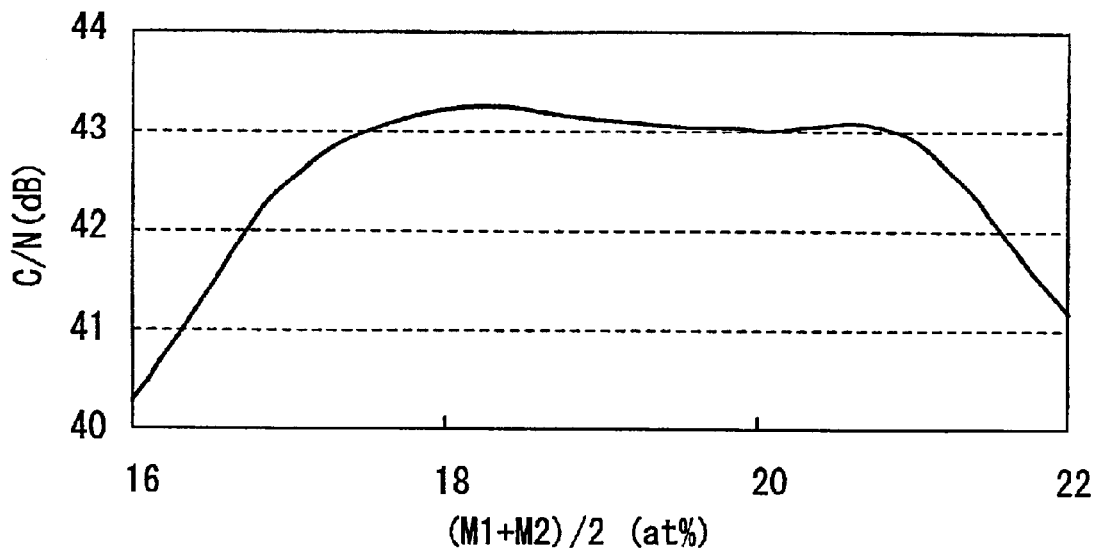
FIG. 5 is a graph indicating a C/N ratio to an average composition of first and second recording layers.

FIG. 5 is a graph indicating a C/N ratio to an average composition of first recording layer 16 and second recording layer 17, namely, a graph showing a dependence of the C/N ratio on the average composition of the recording layers 16 and 17. A result of the measurement is obtained in the following conditions.

An average composition of the first recording layer 16 and the second recording layer 17 is measured as (M1+M2)/2.

The first recording layer 16 has a film thickness t1 of 25 nm; the second recording layer 17 has a film thickness t2 of 25 nm; the recording support film 18 has a film thickness t3 of 5 nm; and Gd composition Ass, namely Ass-Gd, of the recording support layer 19 is 23.0 (at %). In addition, M1−M2 equals 2.5 (at %).

As showed in FIG. 5, it was realized that a desirable C/N ratio can be obtained when the average composition of the first recording layer 16 and the second recording layer 17 is between 17 through 21 (at %).

Figure 6:
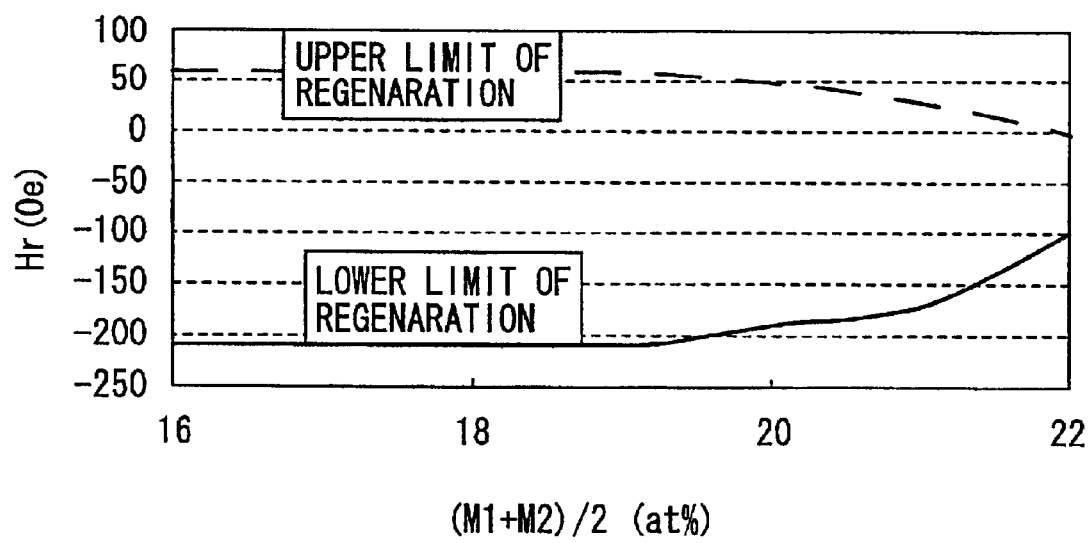
FIG. 6 is a graph indicating a dependence of the reproducing magnetic field.

FIG. 6 is a graph indicating a dependence of the reproducing magnetic field, namely a graph indicating a dependence of an average composition of the first recording layer 16 and the second recording layer 17 on a reproducing magnetic field margin. A reproducing magnetic field Hr has an upper limit and a lower limit so that it is possible to reproduce in a range of the upper limit and the lower limit. It is ideal that a thickness of the range, namely a reproducing magnetic field margin, is wide. As showed in FIG. 6, it was realized that the reproducing magnetic field margin is reduced at a side where the average composition has a large amount of Tb. As showed in FIG. 6, it is preferable that an average composition is 21 (at %) or less, and it is more preferable that an average composition is 20 (at %) or less, in order to obtain sufficient reproducing magnetic field margin.

Figure 7:
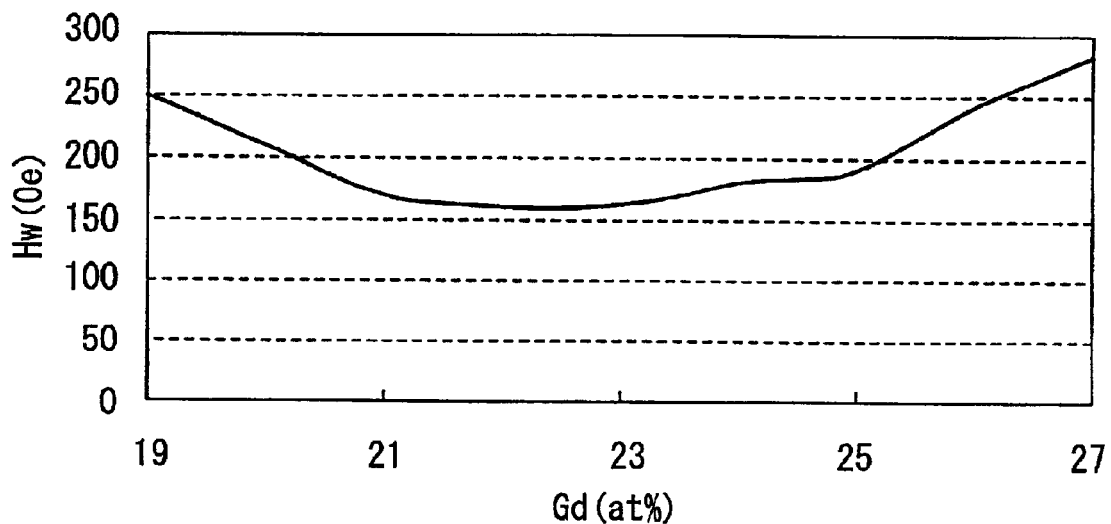
FIG. 7 is a graph showing a dependence of the Gd composition of the recording support layer of the recording magnetic field Hw.

FIG. 7 is a graph showing a dependence on the Gd composition of the recording support layer 18 of the recording magnetic field Hw. The result of the measurement showed in FIG. 7 is based on a test of capability of reproduction by giving an external magnetization from the test drive to the optical magnetic recording medium at the time of reproducing. An average composition of the first recording layer 16 and the second recording layer 17, namely (M1+M2)/2, is 19.0 (at %); M1−M2 equals 2.5 (at %); the first recording layer 16 has a film thickness t1 of 25 nm; the second recording layer 17 has a film thickness t2 of 25 nm; and the recording support film 18 has a film thickness t3 of 5 nm. The result of measurement indicates that the optical magnetic recording medium is strong against the influence of cross talk from the neighboring track, as the reproducing magnetic margin is wider.

As showed in FIG. 7, it is recognized that the Gd composition of the recording support layer 18 may be set in the range of 20% through 25% in order to obtain a property having a small enough recording magnetic field Hw of 200 (Oe) or less. The recording support layer 18 in this range is TM(FeCo) rich and a vertical magnetization film at a room temperature.

Figure 8:
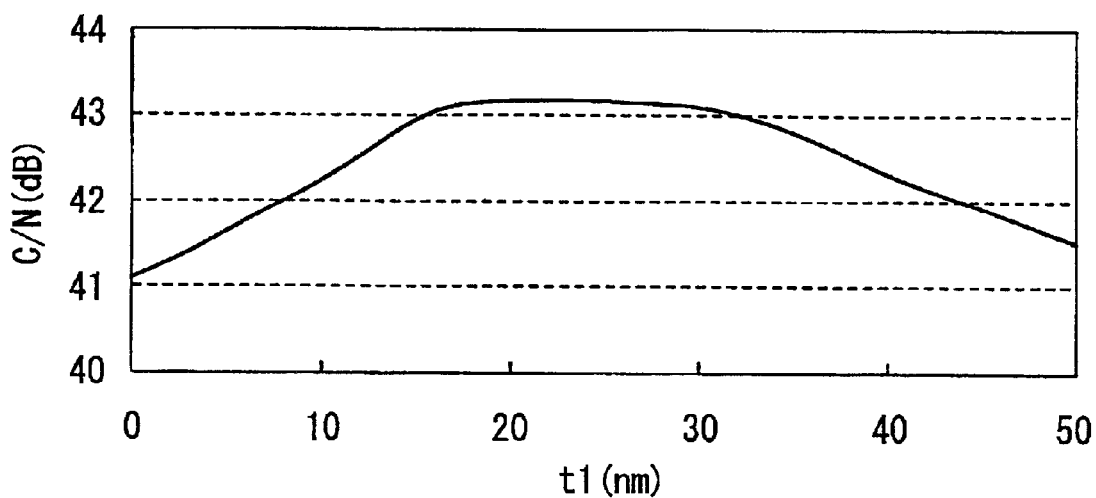
FIG. 8 is a graph indicating a C/N ratio to a film thickness ratio of the first recording layer and the second recording layer.

FIG. 8 is a graph indicating a C/N ratio to a film thickness ratio of the first recording layer 16 and the second recording layer 17, namely a dependence of the C/N ratio to the film thickness ratio of the recording layers 16 and 17. A result of the measurement is obtained in the following conditions. A sum of the film thickness of the first recording layer 16 and the second recording layer 17 are fixed as 50 nm. An average composition of the first recording layer 16 and the second recording layer 17, measured as (M1+M2)/2, is set as 19.0 (at %). M1−M2 equals 2.5 (at %); the recording support film 18 has a film thickness t3 of 5 nm; and the Gd composition Ass, namely Ass-Gd, of the recording support layer 19 is 23.0 (at %).

As showed in FIG. 8, it was recognized to obtain the high C/N ratio in a range of 15 through 25 nm of the film thickness of the first recording layer 16 and the second recording layer 17.

Figure 9:
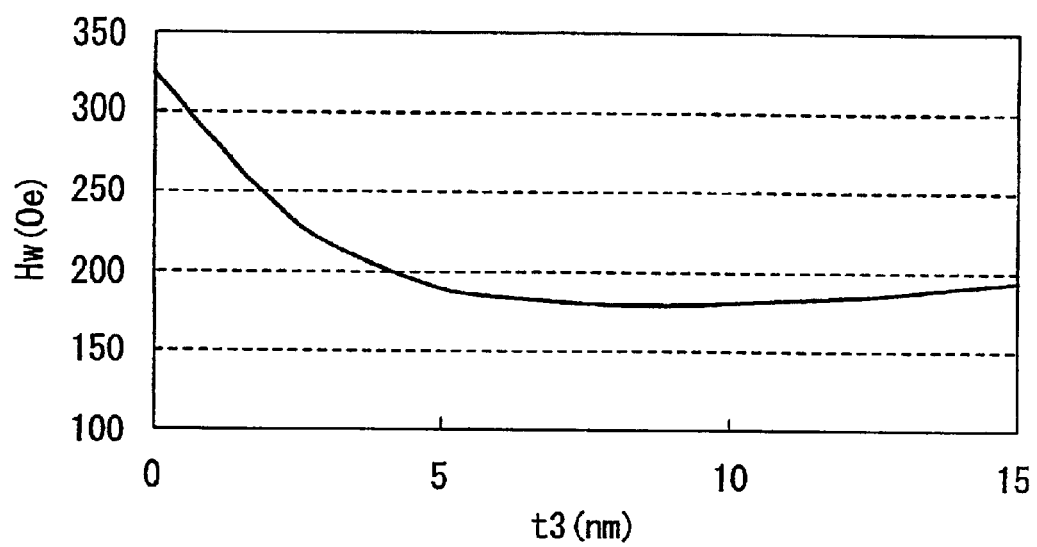
FIG. 9 is a graph indicating a value of the recording magnetic field to the film thickness of the recording support layer.

FIG. 9 is a graph indicating a value of the recording magnetic field to the film thickness of the recording support layer. A result of the measurement is obtained in the following conditions. An average composition of the first recording layer 16 and the second recording layer 17, measured as (M1+M2)/2, is set as 19.0 (at %). M1−M2 equals 2.5 (at %); the first recording layer 16 has a film thickness t1 of 25 nm; the second recording layer 16 has a film thickness t1 of 25 nm; and the Gd composition Ass, namely Ass-Gd, of the recording support layer 19 is 23.0 (at %).

As showed in FIG. 9, it was recognized that the recording support layer 18 may have the film thickness of of 3 nm or more in order to obtain a small enough recording magnetic field Hw of 200 (Oe) or less.

Figure 10:
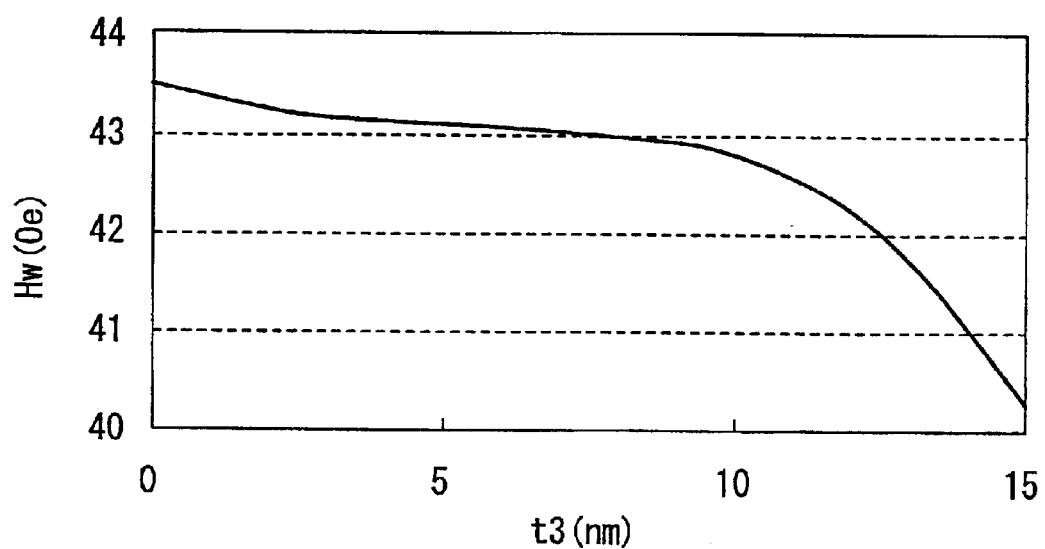
FIG. 10 is a graph indicating a value of the C/N ratio of the film thickness to the film thickness of the recording support layer.

FIG. 10 is a graph indicating a value of the C/N ratio of the film thickness to the film thickness of the recording support layer 18. As showed in FIG. 10, it was recognized that the C/N ratio was reduced in a case where the recording support layer 18 had a film thickness of 10 nm or more. Accordingly, it was recognized that the suitable film thickness of the recording support layer 18 is 3 through 10 nm.

Figure 11:
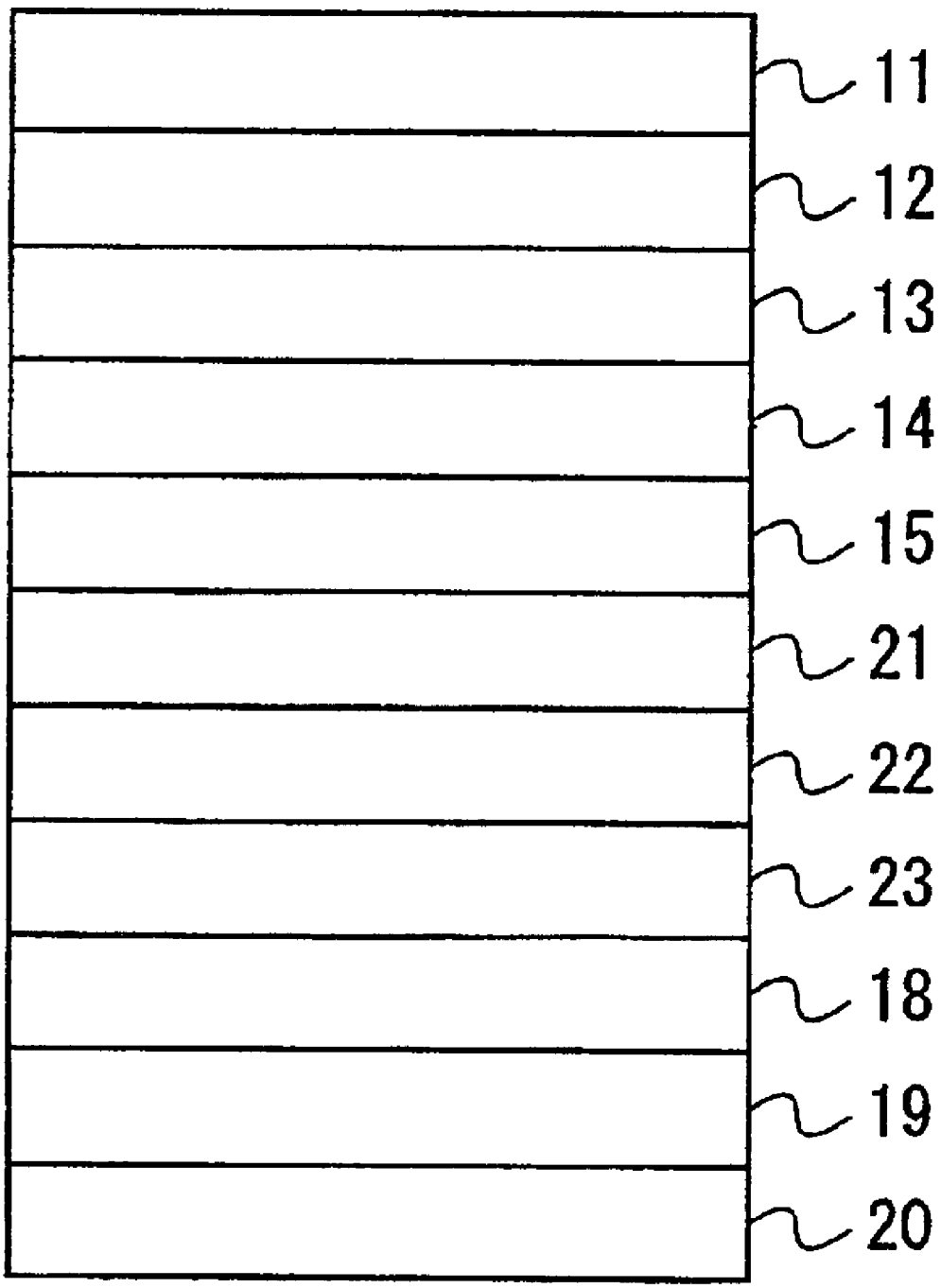
FIG. 11 is a cross sectional view of a part of an optical magnetic recording medium of a second embodiment according to the present invention.

FIG. 11 is a cross sectional view of a part of an optical magnetic recording medium of a second embodiment according to the present invention. In FIG. 11, parts that are the same as the parts showed in FIG. 2 are given the same reference numerals, and explanation thereof will be omitted. In this embodiment, the present invention is applied to an optical magnetic recording medium having a layer structure consisting of three or more recording layers.

The optical magnetic recording medium showed in FIG. 11, the recording layer has a structure of three layers of a first recording layer 21, a second recording layer 22, and a third recording layer 23. The first recording layer 21, the second recording layer 22, and the third recording layer 23 each consist of TbFeCo. The first recording layer 21 has a composition of Tb21.0 (at %) and a film thickness of 15 nm. The second recording layer 22 has a composition of Tb19.0 (at %) and a film thickness of 10 nm. The third recording layer 23 has a composition of Tb17.0 (at %) and a film thickness of 15 nm. The recording support layer 19 has a composition of the Gd composition Ass, namely Ass-Gd, of 23.0 (at %) and a film thickness of 5 nm. There is a relationship of M3<M2<M1 in a state where the composition of the rare-earth metal of the first recording layer 21 is defined as M1 (at %), a composition of the rare-earth metal of the second recording layer 22 is defined as M2 (at %), and the composition of the rare-earth metal of the third recording layer 23 is defined as M3 (at %).

It was recognized that the optical magnetic recording medium in this embodiment has the C/N ratio of 43.4 dB, the recording magnetic field of 150 (Oe), the reproducing magnetic field margin of −200 through 50 (Oe), and the mark length of 0.34 μm.

In a case where the recording layer has a structure of the first recording layer, the second recording layer, . . . , the Nth recording layer, the compositions M1 (at %) through MN (at %) of the rare-earth metal of the first recording layer through the Nth recording layer have a relation of MN<M(N−1)< . . . <M1.

Figure 12:
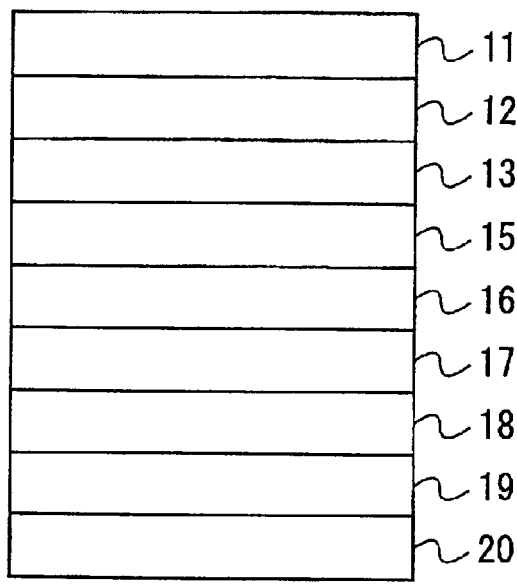
FIG. 12 is a cross sectional view of a part of an optical magnetic recording medium of a third embodiment according to the present invention.

FIG. 12 is a cross sectional view of a part of an optical magnetic recording medium of a third embodiment according to the present invention. In FIG. 11, parts that are the same as the parts showed in FIG. 11 are given the same reference numerals, and explanation thereof will be omitted. In this embodiment, the present invention is applied to an optical magnetic recording medium of an expand reproduction system such as a magnetic amplifying magneto-optical system (MAMMOS).

The reproducing support layer 14 showed in FIG. 2 is provided in the optical magnetic recording medium showed in FIG. 12.

There are the MAMMOS, a domain wall displacement detection (DWDD), an Expand-FAD (front aperture detection) and others as expand reproduction systems. In these respective methods, a mark which is or was transcribed on the reproducing layer at the time of reproducing is read out by expanding the mark. In addition, in these respective methods, the optical magnetic recording medium has a structure in which the non-magnetic layer 15 is put between the reproducing layer 13 and the recording layers 16 and 17 in order to adjust an exchange combination force of the reproducing layer 13 and the recording layers 16 and 17. It is possible to achieve an effect of the present invention when the magnetic field from the recording layers 16 and 17 is used at the time of reproducing, in the optical magnetic recording medium having basic functions of the transcription and the expansion. That is, the recording layers 16 and 17 respectively have a layer structure comprising two or more layers of the recording layers 16 and 17 and the conditions of the compositions and the film thickness of the respective recording layers 16 and 17 are set as described above, so that a desirable C/N ratio and a enough small recording magnetic field Hw can be obtained.

Figure 13:
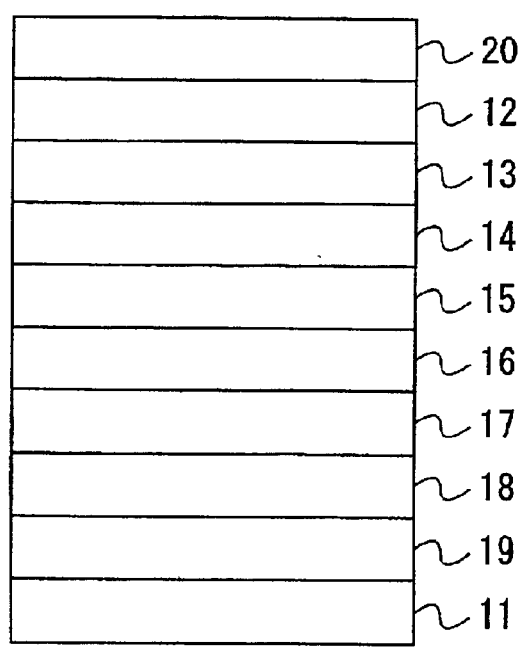
FIG. 13 is a cross sectional view of a part of an optical magnetic recording medium of a fourth embodiment according to the present invention.

FIG. 13 is a cross sectional view of a part of an optical magnetic recording medium of a fourth embodiment according to the present invention. In FIG. 13, parts that are the same as the parts showed in FIG. 2 are given the same reference numerals, and explanation thereof will be omitted. In this embodiment, the present invention is applied to an optical magnetic recording medium of a film surface recording method.

In this embodiment, as showed in FIG. 13, the positions of the sensitivity adjustment layer 20 and the substrate 11 are switched as compared with the embodiment showed in FIG. 2. The respective layers 19 through 12 and 20 may be deposited from a side of the substrate 11 in order to manufacture the optical magnetic recording medium in this embodiment.

In the respective embodiments, a material for comprising the respective layers is not limited to the above mentioned materials. For instance, the reproducing layer 13 is not limited to an alloy whose main ingredient is GdFeCo, but an alloy whose main ingredient is GdNdFeCo, GdDyFeCo, or others can be used as the reproducing layer 13. The recording layers 16, 17, 21 through 23 are not limited to TbFeCo, but an alloy whose main ingredient is TbDyFeCo, TbGdFeCo, TbDyGdFeCo, or others can be used as the recording layers 16, 17, 21 through 23. It is possible to obtain an effect of the present invention described above by relatively increasing an RE metal composition of the first recording layers 16 and 21 at the reproduction side 13 and relatively decreasing an RE metal composition of the second and third recording layers 17, 22, and 23, in a case that either material described above is used. In addition, the recording support layer 18 is not limited to an alloy whose main ingredient is GdFeCo, but an alloy whose main ingredient is GdNdFeCo, GdDyFeCo, or others can be used as the recording support layer 18. It is preferable that the recording support layer 18 has the Gd composition superiority (TM rich) composition.

When the Tb composition of the first recording layer 16 or 21 is defined as M1 and the Tb composition of the second recording layer 17 or 22 is defined as M2, it is preferable to have relations of 17.0 (at %)<(M1+M2)/2<21.0 (at %) and 1.0 (at %)<M1−M2<4.0 (at %). It is also preferable that the Gd composition Ass (%) of the recording support layer 18 has a relation of 20 (at %)<Ass<25 (at %). Furthermore, when the film thickness of the first recording layer 15 or 21 is defined as t1 and the film thickness of the second recording layer 16 or 22 is defined as t2, it is preferable to have relations of 15 nm<t1<35 nm and 15<t2<35 nm. In addition, when the film thickness of the first recording layer 15 or 21 as t1, the film thickness of the second recording layer 16 or 22 is defined as t2, and the film thickness of the third recording layer 18 is defined as t3, it is preferable to have relations of 15 nm<t1<35 nm, 15<t2<35 nm, and 3 nm<t3<10 nm.

Figure 14:
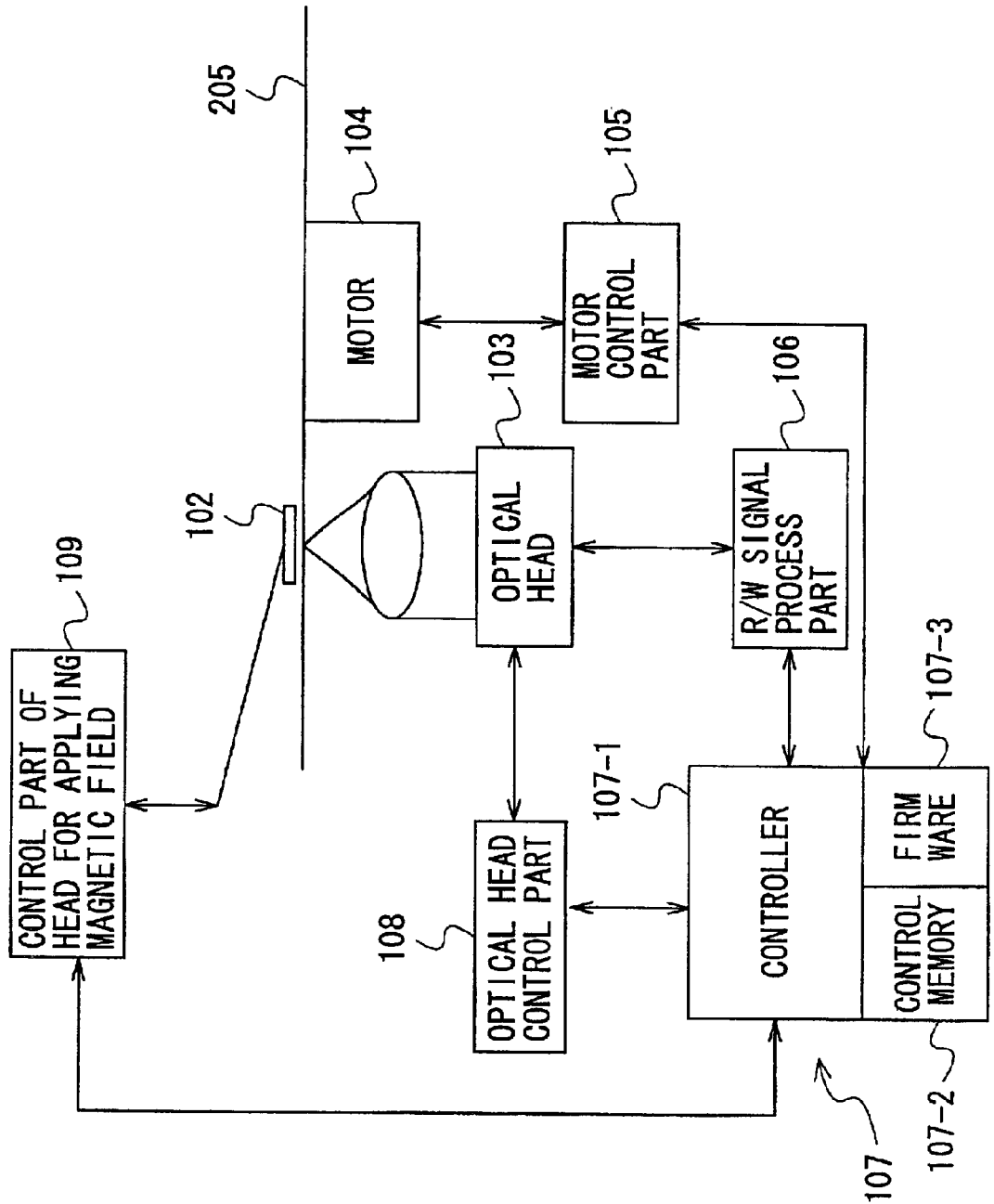
FIG. 14 is a view indicating a part of one embodiment of the storage device of the present invention.

Next, an embodiment of the storage device of the present invention will be described with reference to FIG. 14. FIG. 14 is a view indicating a part of one embodiment of the storage device of the present invention.

In FIG. 14, a storage device 100 includes a head 102 for applying a magnetic field, an optical head 103, a rotatable motor 104, a motor control part 105, a read/write (R/W) signal process part 106, a control part 107, an optical head control part 108 and a control part 109 of a head for applying a magnetic field. The optical head 103 irradiates an optical beam to an optical magnetic disk 205 and detects a reflective optical beam from the optical magnetic disk 205. The control part 107 includes a controller 107-1, a control memory 107-2 consisting of ROM or RAM, for example, and a firm ware 107-3. The magnetic field to be applied to the optical magnetic disk 205 at the time of recording is generated by the head 102 for applying a magnetic field. Based on a special quality of the optical magnetic disk 205, if necessary, a support reproducing magnetic field may be applied from the head 102 for applying a magnetic field. The optical head 103 irradiates an optical beam to the optical magnetic disk 205 with a designated recording power for the optical magnetic disk 205 at the time of recording. In addition, the optical head 103 irradiates an optical beam to the optical magnetic disk 205 with a designated reproducing power for the optical magnetic disk 205 at the time of reproducing. Since the optical magnetic disk 205 is a medium to be capable of over writing, an erase operation is included in the writing operation.

The motor 104 is provided to rotate the optical magnetic disk 205 and controlled by the motor control part 105. The R/W signal process part 106 manages to make a write signal to the optical head 103 have a proper signal form. Furthermore, the R/W signal process part 106 manages to make a read signal from the optical head 103 having a proper signal form. The control part 107 includes an MPU and others so that the control part 107 controls the whole operation of the storage device 100. The optical head control part 108 controls a position of the optical head 103 and power of the optical beam irradiated. The control part 109 of a head for applying a magnetic field controls a position of the head 102 for applying a magnetic field and the magnetic field generated. The control part 107 controls the above described control parts 105, 106 and 109, supplies the write signal to the R/W signal process part 106, and inputs the read signal from the R/W signal process part 106. The write signal to the control part 107 is input from a host apparatus not showed in FIG. 14. The read signal is supplied from the control part 107 to the host apparatus.

A basic structure of the storage device 100 is well known in FIG. 2 of the Japanese Laid-Open Patent Application No. 11-242834. In the embodiment of the present invention, the optical magnetic disk 205 has a structure showed as the optical magnetic recording medium in an either embodiment. In addition, at least, the power of the optical beam corresponding to the optical magnetic disk 205 such as a reproducing power of 1.5 mW or a recording power of 2 mW, or an amount to apply the magnetic field such as 150 oersted (Oe) are registered in the control memory 107-2. When the optical magnetic disk 205 is inserted in the storage device 100, the controller 107-1 takes a control value corresponding to the optical magnetic disk 205 from the memory 107-2 and sets the control value in the firm ware 107-3, the optical head control part 108, and the control part 109 of a head for applying a magnetic field. As a result, recording or reproducing, namely writing or reading, to the optical magnetic disk 205 is prepared. The control value can be changed in order to correspond to an environment of the storage device 100 or a peculiar special quality of the optical magnetic disk 205. When the control value is changed, a modifying control is implemented based on a changed value stored in the control memory 107-2.

The optical magnetic disk 205 may be detachable from the storage device 100. The storage device 100 may have a plurality of the optical magnetic disks 205.

Since the optical magnetic disk 205 has a structure of either of the above described embodiments, a recording magnetic field to be generated from the head 102 for applying a magnetic field can become small in the storage device 100 and thereby electric power consumption of the storage device 100 can be reduced. In addition, since the magnetic disk 205 has a high C/N ratio, it is possible to record a short mark and increase bit density. Furthermore, since the optical magnetic disk 205 has a wide reproducing magnetic field margin, the influence of cross talk from a neighboring track on the optical magnetic disk 205 can be reduced. As a result, it is possible to make the track pitch on the optical magnetic disk 205 narrow. Therefore, it is possible to record information on the optical magnetic disk 205 with a high density and expand the memory capacity of the storage device 100.

The present invention is not limited to these embodiments, but variations and modifications may be made without departing from the scope of the present invention.

This patent application is based on Japanese priority patent application No. 2001-359310 filed on Nov. 26, 2001, the entire contents of which are hereby incorporated by reference.

What is claimed is:

1. An optical magnetic recording medium in which reproduction is implemented by transcribing a mark to a reproducing layer based on a magnetic field from a recording layer, comprising the reproducing layer, a non-magnetic layer, and the recording layer including a first recording layer and a second recording layer being directly adjacent to and stacked on the first recording layer, wherein the reproducing layer, the non-magnetic layer, and the recording layer including the first recording layer and the second recording layer are stacked in sequence; the reproducing layer has a property of an easy magnetization in an in-plane direction at room temperature;

the first recording layer and the second recording layer each has a property of easy magnetization in a vertical direction to the in-plane direction at room temperature in a single layer; and there is a relation of $M2<M1$ wherein a composition of a rare-earth metal comprising the first recording layer is defined as $M1$(at %) and a composition of a rare-earth metal comprising the second recording layer is defined as $M2$(at %).

2. The optical magnetic recording medium as claimed in claim 1, further comprising a recording support layer stacked on the second recording layer, wherein the recording support layer is made of GdFeCO having a property of an easy magnetization in the vertical direction at room temperature as a main composition element.

3. The optical magnetic recording medium as claimed in claim 2, wherein a material comprising the recording support layer is a Gd composition with a superior transition metal composition at room temperature.

4. The optical magnetic recording medium as claimed in claim 1, wherein the first recording layer and the second recording layer are made of a material in which ThFeCo is a main composition element, and there are relations of $17.0(at\%) < (M1+M2)/2 < 21.0(at\%)$ and $1.0(at\%) < M1-M2 < 4.0(at\%)$ wherein a Tb composition of the first recording layer is defined as $M1$ and a Tb composition of the second recording layer is defined as $M2$.

5. The optical magnetic recording medium as claimed in claim 2, wherein there is a relation of $20(at\%) < Ass < 25(at\%)$ in which a Gd composition of the recording support layer is defined $Ass(\%)$.

6. The optical magnetic recording medium as claimed in claim 1, wherein there are relations of $15 nm < t1 < 35 nm$ and $15 mn < t2 < 35 nm$ in which a film thickness of the first recording layer is defined as $t1$ and a film thickness of the second recording layer is defined as $t2$.

7. The optical magnetic recording medium as claimed in claim 2, wherein there are relations of $15 nm < t1 < 35 nm$, $15 nm < t2 < 35 nm$, and $3 nm < t3 < 10 nm$ in which a film thickness of the first recording layer is defined as $t1$, a film thickness of the second recording layer is defined as $t2$, and a film thickness of the recording support layer is defined as $t3$.

8. An optical magnetic recording medium in which reproduction is implemented by transcribing a mark to a reproducing layer based on a magnetic field from a recording layer, comprising the reproducing layer, a non-magnetic layer, and the recording layer including a first recording layer through an Nth recording layer, wherein the reproducing layer, the non-magnetic layer, and the recording layer including the first recording layer through the Nth recording layer are stacked in sequence such that a second recording layer is directly adjacent to and stacked on the first recording layer;

the reproducing layer has a property of an easy magnetization in an in-plane direction at room temperature;

the first recording layer through the Nth recording layer each has a property of an easy magnetization in a vertical direction to the in-plane direction at room temperature in a single layer; and there is a relation of $MN < M(N-1) < \ldots < M1$ wherein a composition of a rare-earth metal consisting of the first recording layer is defined as $M1$(at %), . . . , and a composition of a rare-earth metal consisting of the Nth recording layer is defined as $MN$(at %).

9. The optical magnetic recording medium as claimed in claim 8, further comprising a recording support layer stacked on the Nth recording layer, wherein the recording support layer is made of GdFeCO having a property of an easy magnetization in the vertical direction at room temperature as a main composition element.

10. A storage device, comprising a head applying a magnetic field to an optical magnetic recording medium and an optical head irradiating an optical beam to the optical magnetic recoding medium, wherein the optical magnetic recording medium in which reproduction is implemented by transcribing a mark to a reproducing layer based on a magnetic field from a recording layer, comprises the reproducing layer, a non-magnetic layer, and the recording layer including a first recording layer and a second recording layer being directly adjacent to and stacked on the first recording layer, wherein the reproducing layer, the non-magnetic layer, and the recording layer including the first recording layer and the second recording layer are stacked in sequence;

the reproducing layer has a property of an easy magnetization in an in-plane direction at room temperature;

the first recording layer and the second recording layer each has a property of easy magnetization in a vertical direction to the in-plane direction at room temperature in a single layer; and there is a relation of M2<M1 wherein a composition of a rare-earth metal comprising the first recording layer is defined as M1(at %) and a composition of a rare-earth metal comprising the second recording layer is defined as M2(at %).

* * * * *